Aug. 27, 1946.  R. C. KOEPNICK ET AL  2,406,386
GLOVE-SIZE TESTER
Filed May 15, 1945
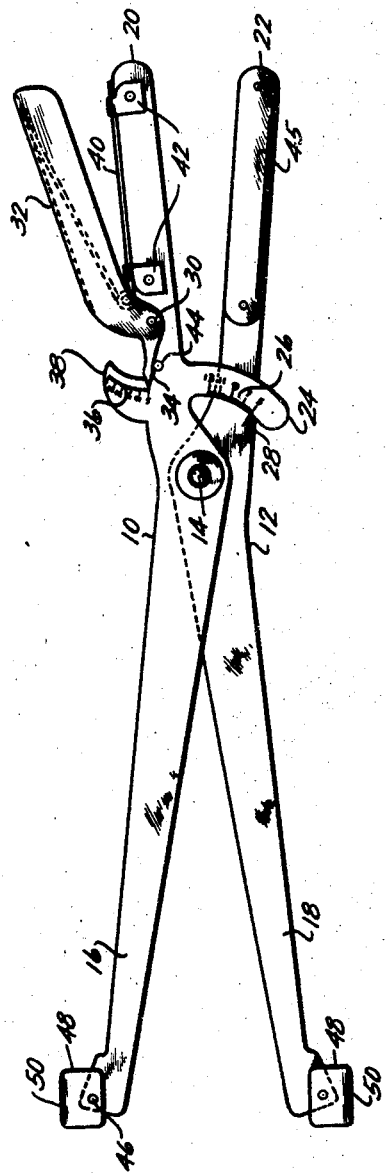
INVENTORS.
ROBERT C. KOEPNICK
DONALD I. PATT
BY FRANCIS E. RANDALL
ATTORNEYS Patented Aug. 27, 1946

2,406,386

UNITED STATES PATENT OFFICE 2,406,386

GLOVE-SIZE TESTER

Robert C. Koepnick, Dayton, Ohio, Donald I. Patt, Providence, R. I., and Francis E. Randall, New Philadelphia, Ohio Application May 15, 1945, Serial No. 593,919

6 Claims. (Cl. 73—88)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a device for determining the size of a glove and particularly for determining the size to which it will be extended upon application of a predetermined stress.

Testing the size of gloves as heretofore practiced has generally been accomplished with a device somewhat of the form of the well known spring clothespin, that is, two limbs are medially hinged and with one pair of ends shaped for a hand-grip and the other pair of ends shaped substantially like an inside caliper, whereby manual pressing together of the hand-grip ends spreads the inside caliper ends. Sometimes there is provided a spring to return the caliper ends to minimum size when no hand-grip pressure is being applied. There is generally provided a graduated scale to indicate the size of the glove being measured.

With this conventional glove measuring device, dependence must be placed entirely on the judgment of the user as to how much pressure he is applying to the hand-grip. Thus when measured by a user with a strong grip, a glove could conceivably register a fractional size larger than when the same glove was measured by a user having a weak grip, this condition being more pronounced as the material of the glove being tested is more elastic.

It is therefore an object of this invention to provide a device which will not only indicate the glove size but will also indicate the pressure being applied to cause the glove to assume that size, whereby when the proper pressure for a material of a given elasticity has been established for each fractional size glove, all gloves sized by the device will be alike irrespective of the ability of one of the sizers to apply a greater pressure than another.

In the conventional glove sizing tool hereinbefore described, the inside caliper ends are rounded to allow for different amounts of spread of the caliper ends. Such rounded ends will sink more deeply into a softer glove fabric with a given applied pressure than they will into a less yieldable fabric.

It is therefore another object of this invention to provide our improved device with swivelled caliper ends having parallel sides whereby the measurement is taken over a considerable length instead of at a point today.

We attain this and other objects and advantages by the device hereinafter more specifically described, reference being had to the drawing, wherein:

The single figure is a plan view of the improved glove sizing device made in accordance with our invention.

Like reference characters refer to like parts throughout the drawing.

In the drawing, two elongated members 10 and 12 are hinged together at 14 so as to provide two measuring limbs 16 and 18 somewhat of the form of an inside caliper, and two handle limbs 20 and 22 extending oppositely of the measuring limbs with respect to pivot 14. Due to the manner in which the members are hinged, pressing together the handle ends forces the measuring ends apart.

An arcuate segment 24, preferably centered at 14, depends from the handle part 20 and carries a scale 26 graduated with the glove sizes to be measured. An index line 28 for the arcuate scale is carried on the handle part 22.

Hinged at 30 to the handle part 20 is a third handle part 32 preferably made of sheet metal and provided with a pointer portion 34 which is adapted for register with an arcuate scale 36 carried on a projection 38 of the handle part 20. The arcuate scale 36 is preferably centered at 30 and is graduated in units of pressure, the number of which is predetermined for a given size glove of a given material. An expansible spring 40 has one leg attached to the handle part 20 by clips 42 and the other leg lying in the hollow underside of the handle grip 32. A stop pin 44 limits travel of the third handle part 32 and of the pointer 34. Rounded plates 45 preferably of wood or plastic may be attached to the handle part 22 to render gripping of the handle more comfortable.

Hinged at 46 to the free ends of the caliper parts 16 and 18 are contact members 48 which have sufficient freedom of movement about the hinges that their edges 50 may remain parallel or may conform to the substantially parallel inner surfaces of the glove being measured, whereby the caliper ends will not sink into a relatively soft glove fabric and thus give an incorrect reading as could well be the case where a rigid point or ball end was provided on the caliper points.

The operation of the device is as follows:

The units of pressure for the glove about to be tested having been previously determined, the contact ends 48 are inserted in the glove and the handle parts 45—32 are pressed together until the caliper ends 48 come up taut in the glove.

Further gripping of the handle will cause the spring 40 to yield and the pointer 34 to leave the stop 44 and move upward along the arcuate scale 36 until it reaches the graduation thereon which represents the required predetermined pressure. The size of the glove may now be read on the scale 26 at the index line 28.

It will be obvious from the foregoing description that the amount of the pressure to be applied to the handle parts is not left to the judgment of the operator, the same result being had whether he has a strong or a weak grip and whether he is skilled or unskilled in the work.

Having described an embodiment of our invention, we claim:

1. In a device for sizing a glove, an inside caliper adapted for insertion into the glove, manual means for forcing the legs of the caliper apart to cause them to contact the inside of said glove, means interposed between said manual means and said caliper, adapted to yield upon application of increased force to said manual means after said caliper has contacted the inside of said glove, means to indicate the extent of said increased force, and size indicating means to indicate the size of the glove when said increased force indicating means is brought to a predetermined value.

2. The device defined in claim 1 in combination with self-aligning contact members hinged to the free ends of the inside caliper.

3. In a device for sizing a glove, an inside caliper adapted for insertion into the glove, manual means for pressing the legs of the caliper apart to cause them to contact the inside of said glove, a resilient means interposed between said manual means and said caliper, adapted to yield upon application of a predetermined pressure to said manual means after said caliper has contacted the inside of said glove, means to indicate the extent which said resilient means has yielded, and means to indicate the size of the glove under a predetermined degree of said yielding.

4. A device for sizing a glove which comprises two elongated members medially hinged to provide a pair of inside caliper legs at one end with a pair of handle parts at the other end, the manner of hinging the members being such that pressing together the handle parts spreads the caliper legs, a size measuring scale carried by one of said handle parts extending across the other handle part, said other handle part being provided with an index line for association with said scale, a force measuring scale carried on one of said handle parts, a third handle part hinged to the handle part which carries said force measuring scale, index means on said third handle part for association with said force measuring scale, and a resilient means urging the free end of the third handle part away from the end of the handle part to which it is hinged.

5. A device for sizing a glove which comprises two elongated members hinged intermediate their ends to provide a pair of inside caliper legs at one end, with first and second handle parts at the other end, the manner of hinging the members being such that pressing together the handle parts spreads the caliper legs, a size measuring scale carried by the said second handle part extending across the first handle part, said first handle part being provided with an index line for association with said scale, a force measuring scale carried on said second handle part, a third handle part hinged to said second handle part, index means on said third handle part for association with said force measuring scale, and a resilient means urging the free end of the third handle part away from the free end of the second handle part.

6. A device for sizing a glove which comprises two elongated members hinged to each other along one side to provide a pair of inside caliper legs at one end and first and second handle parts at the other end, the manner of hinging the members being such that pressing together the handle parts spreads the caliper legs apart, a size measuring scale depending from the second handle parts extending across the first handle part, said first handle part being provided with an index line for association with said scale, a force measuring scale member extending from the second handle part in a direction away from said first handle part, a third handle part hinged to the second handle part adjacent to said force measuring scale, an index pointer on said third handle part for association with said force measuring scale, and a resilient means urging the free end of the third handle part away from the free end of the second handle part.

ROBERT C. KOEPNICK.
DONALD I. PATT.
FRANCIS E. RANDALL.